Patented June 12, 1945

2,378,309

UNITED STATES PATENT OFFICE 2,378,309

PARASITICIDAL COMPOSITIONS

George E. Lynn and Fred W. Fletcher, Midland, Mich., assignors to The Dow Chemical Company, Midland, Mich., a corporation of Michigan No Drawing. Application December 1, 1941, Serial No. 421,247

5 Claims. (Cl. 167—30)

This invention relates to materials adapted to be employed for the control of household insect pests, or applied to trees and plants as an agricultural parasiticide. It is especially concerned with insecticidal compositions comprising alpha-diphenyl-ethane and combinations thereof with such organic parasiticidal toxicants as dinitro-phenols, rotenone, pyrethrins, and the like.

Dinitro-phenols and rotenone-containing products such as derris, cubé, etc., have been suggested for use in many parasiticidal compositions in combination with inorganic and organic diluents. Petroleum distillates are frequently employed as carriers for such toxicants and, under certain conditions, mixtures comprising distillate and toxicant can be advantageously employed for the control of agricultural or household pests. Such compositions, however, are subject to a serious disadvantage in that rotenone and many of the dinitro-phenols and their salts are but slightly soluble in commercially available petroleum oils, whereby the preparation of such compositions and particularly of concentrates comprising appreciable percentages of toxicant, are not readily accomplished. A further disadvantage lies in the fact that oily solutions of organic parasiticidal toxicants are hard to disperse in water, necessitating the use of relatively large quantities of emulsifying or dispersing agents to obtain suitable emulsion compositions.

In a co-pending application, Serial No. 342,444, filed June 26, 1940, we have disclosed certain improved parasiticidal compositions comprising such organic toxicants as dinitro-phenols dissolved in a synthetic oily carrier. A preferred embodiment of the carrier was obtained as a by-product in an alkylation procedure and was erroneously identified as "A liquid aliphatic mono-olefin hydrocarbon" boiling about 120° C. at 2 millimeters pressure and having a viscosity above 45 seconds Saybolt at 100° F. It has since been discovered that the analytical data upon which the identification of this oily material was predicated was in error and that this product is in fact a high-boiling reaction product of ethylene, acetylene, and benzene consisting essentially of alpha-diphenyl-ethane and ethyl substitution products thereof. This high-boiling liquid product is hereinafter termed "alpha-diphenyl-ethane fraction" for purposes of convenience.

We have discovered that the alpha-diphenyl-ethane fraction has definite parasiticidal properties against certain insect pests and is a very desirable carrier for organic toxicants generally, and dinitrophenol and rotenone in particular. Parasiticidal combinations comprising the alpha-diphenyl-ethane fraction or solutions of organic toxicants therein are not subject to many of the disadvantages inherent in analogous combinations comprising petroleum distillates and are generally more effective. The dinitro-phenols, rotenone, and other organic toxicants are much more soluble in the alpha-diphenyl-ethane fraction than in petroleum products, so that liquid concentrates of the toxicants are readily prepared. As such concentrates are miscible in all proportions with petroleum oils, the alpha-diphenyl-ethane fraction may be used conveniently as a solubilizing agent in the preparation of emulsions or solutions in which the major oily constituent is of petroleum origin. Furthermore, solutions of organic toxicants in the alpha-diphenyl-ethane fraction emulsify readily with water whereby reduced amounts of dispersing or emulsifying agents are required as compared to the amounts necessary to accomplish a like result with analogous petroleum distillate solutions.

The alpha-diphenyl-ethane fraction is obtained as a by-product in the alkylation of aromatic derivatives. For example, a gas containing 40-50 per cent of ethylene, 2-5 per cent of propylene, 2-5 per cent of acetylene and the remainder saturated aliphatic hydrocarbons, was reacted with benzene in the presence of anhydrous aluminum chloride under 2-3 pounds pressure per square inch and at a temperature of approximately 60° C. Upon fractional distillation, a variety of alkylated benzenes were obtained, and as a higher boiling product, a fraction consisting essentially of alpha-diphenyl-ethane and its ethyl substitution products having a boiling temperature and Saybolt viscosity as hereinbefore set forth.

In an alternate procedure a gaseous mixture obtained by the cracking of petroleum distillate is employed as a reactant. This gas contains 4-5 per cent acetylene, 40-42 per cent ethylene, approximately 20 per cent of propylene, butylene, and butadiene, and from 30-40 per cent of various inerts such as methane, ethane, and hydrogen. This mixture is chlorinated according to known procedures to remove propylene, butylene, butadiene, and related products as a liquid chlorinated fraction leaving a gaseous residue comprising 6-8 per cent acetylene, 48-50 per cent of ethylene and 45-50 per cent inerts. This residue gas is then reacted with benzene in the presence of aluminum chloride at atmospheric pressure and elevated temperature to obtain a crude reaction mixture. This mixture is stripped of benezene and low-boiling alkyl benzenes by fractional distillation at atmospheric pressure. The residue, boiling above 250° C., is fractionated under reduced pressure to obtain a liquid product distilling above approximately 120° C. at 2 millimeters pressure and constituting the alpha-diphenyl-ethane fraction with which the present invention is primarily concerned.

The following examples are not to be construed as limiting:

Example 1

The solubility of several representative dinitrophenols in an alpha-diphenyl-ethane fraction and in various oils of petroleum origin was determined in order to obtain a comparison of the oils as toxicant carriers in the preparation of insecticidal concentrates. The alpha-diphenyl-ethane fraction employed had a viscosity of 49 seconds Saybolt at 100° F. and boiled at 124°–169° C. at 2 millimeters pressure.

2.4-dinitro-6-cyclohexyl-phenol was found to be soluble in the alpha-diphenyl-ethane fraction to the extent of between 20 and 25 per cent by weight at 22° C., at which concentration the oily solution became so viscous as to render further solubility determinations impossible. The solubility of this compound in a representative naphthenic base oil having a viscosity of 37.8 seconds Saybolt at 100° F., a specific gravity of 0.918, and an unsulphonatable residue of 70 (according to the California method), was 8.9 per cent by weight at 22° C. In a representative paraffin base oil having a viscosity of 41.9 seconds Saybolt at 100° F., a specific gravity of 0.887, and an unsulphonated residue of 82 (according to the California method), the 2.4-dinitro-6-cyclohexyl-phenol was soluble to the extent of 4.25 per cent by weight at 22° C.

The solubility of 2.4-dinitro-6-methyl-phenol in the alpha-diphenyl-ethane fraction at 22° C. was found to be 12 per cent by weight. The corresponding solubility of the compound in the naphthenic base oil described above was 7.81 per cent by weight at 22° C.

2.4-dinitro-phenol was found to be soluble in the alpha-diphenyl-ethane fraction to the extent of 5 per cent by weight at 22° C. and in the naphthenic base oil to the extent of 1.5 per cent at 22° C.

In a similar manner alpha-diphenyl-ethane fraction and the paraffin base oil were employed as solvents for rotenone. The solubility at 22° C. of rotenone in alpha-diphenyl-ethane fraction was found to be 6 per cent by weight, and in the paraffin oil, 0.2 per cent.

The saturated solutions of the dinitro-phenols and of rotenone in alpha-diphenyl-ethane, as described above, were found suitable as concentrates for the preparation of aqueous emulsions adapted to be employed for the control of insect pests. In such compositions the oil solutions were compounded with water in the presence of various wetting and dispersing agents such as sodium caseinate, blood albumen, bentonite, sulfonated oils and alcohols, phenol-sulfonic acids, and the like.

Example 2

Alpha-diphenyl-ethane fraction solutions of the dinitro-phenols were tested with various emulsifiers and dispersing agents to obtain a comparison of the amounts of the latter required to accomplish emulsification as compared to the amounts required with analogous compositions containing oils of petroleum origin. It was found that an aqueous solution of 0.06 per cent by weight of sodium oleate gave a satisfactory emulsion with 2 per cent by weight of the alpha-diphenyl-ethane fraction compositions in water. 0.125 per cent by weight of the sodium oleate was required to obtain an emulsion of comparable stability with compositions comprising a white oil having an unsulfonatable residue of 98–100 or the naphthenic base oil described in Example 1.

A similar determination was carried out with miscible type oil compositions employing a partially neutralized sulfonated sperm oil as the emulsifier. It was found that a 2 per cent by weight emulsion of an alpha-diphenyl-ethane fraction solution could be obtained in water when enough of the emulsifier was incorporated in the oily concentrate to give in the emulsion a concentration of 0.06 per cent by weight. To obtain a miscible composition from the white oil concentrate which would form a suitable 2 per cent emulsion with water, it was necessary to incorporate in the concentrate an amount of emulsifier sufficient to give in the final emulsion a concentration of 0.4 per cent by weight.

Example 3

25 parts by weight of an alpha-diphenyl-ethane fraction boiling at 135° C.–180° C. at 2 millimeters pressure and having a viscosity of 53 seconds Saybolt at 100° F. was dissolved in 75 parts of a high-boiling white kerosene product. This solution was employed as a spray against house-flies according to the well-known testing procedure originated by Peet and Grady and described in Soap, 8, No. 4, 1932. In this determination the spray composition gave a knock-down of 91 per cent of the flies in 10 minutes and a kill of 76 per cent in 48 hours.

Other compositions adapted to be similarly employed comprise the alpha-diphenyl-ethane fractions in amount of from 5–50 per cent by weight as carriers for rotenone, pyrethrins, organic thiocyanates, etc.

Example 4

An emulsion was prepared consisting of 0.08 pound of 2.4-dinitro-6-cyclohexyl-phenol, 2 pounds of the alpha-diphenyl-ethane fraction, 0.16 pound of a mixture of bentonite and dried sulphite waste liquor, and sufficient water to give a total of 100 pounds of composition. This emulsion was found to give 100 per cent control against the eggs of *Lygaeus kalmii* Stal.

A similar composition comprising 2 per cent of the alpha-diphenyl-ethane fraction, 0.005 per cent of 2.4-dinitro-6-cyclohexyl-phenol, 0.5 per cent of sodium caseinate as an emulsifier, and sufficient water to make 100 milliliters of emulsion, gave 100 per cent control of poplar aphis without injury to vegetation.

Example 5

A solution of 4 per cent by weight of 2.4-dinitro-6-cyclohexyl-phenol in alpha-diphenyl-ethane fraction was emulsified with sufficient water to obtain compositions comprising 1, 2, and 3 per cent by weight of the oil-dinitro phenol toxicant mixture. 0.75 pound each of bentonite and dried sulphite pulping waste liquor per 100 gallons were employed as the dispersing agent. This composition was compared with an emulsion in which the naphthenic base oil described in Example 1 was stubstituted for the alpha-diphenyl-ethane fraction, with respect to insecticidal efficiency and tree tolerance. The diluted compositions were applied to apple trees at a time when the leaf and blossom buds were well advanced in development. No differences were observed between the two compositions as regards control of scale and aphis infestation. The composition containing the alpha-diphenyl-ethane fraction was found to be substantially less injurious to the growing buds than was the composition containing the petroleum oil.

Among other dinitro compounds which can be employed substantially as described in the foregoing examples are: 2-normal-octyl-4.6-dinitro-phenol, 3-cyclohexyl-4.6-dinitro-phenol, 2-benzyl-4.6-dinitro-phenol, 2-chloro-4.6-dinitro - phenol, 2.4-dinitro-5-naphthylamino-phenol, 2.6-dinitro-4-methyl-phenol, 2.5-dinitro-4-cyclohexyl-phenol, 2.4-dinitro-6-phenyl-phenol, 2.4-dinitro-5-alpha-naphthylamino-phenol, and 2.4-dinitro-6-aceto phenol. Similarly, mixtures of these phenols may be employed as for example, a mixture of 2.4-dinitro-cresol and 2.4-dinitro-6-cyclohexyl-phenol, or a ternary mixture of 2.4-dinitro-phenol, 2.4-dinitro-cresol and 2.4-dinitro-6-cyclohexyl-phenol. While any suitable dinitro-phenol is included within the scope of the present invention. A preferred group are those having the formula

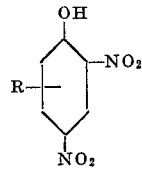

wherein R represents a hydrocarbon radical or hydrogen.

We claim:
1. An insecticidal composition comprising as an active toxicant an alpha-diphenyl-ethane fraction boiling above 120° C. at 2 millimeters pressure, and having a viscosity above 45 seconds Saybolt at 100° F., and a carrier therefor.

2. An insecticidal composition comprising a nitro-phenol dissolved in an alpha-diphenyl-ethane fraction boiling above 120° C. at 2 millimeters pressure and having a viscosity above 45 seconds Saybolt at 100° F.

3. An insecticidal composition comprising as an active toxicant a phenol having the formula

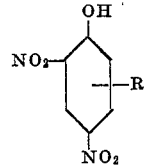

wherein R represents a member of the group consisting of hydrocarbon radicals and hydrogen, dissolved in an alpha-diphenyl-ethane fraction boiling above 120° C. at 2 millimeters pressure and having a viscosity above 45 seconds Saybolt at 100° F.

4. An insecticidal composition comprising 2.4-dinitro-6-cyclohexyl-phenol dissolved in an alpha-diphenyl-ethane fraction boiling above 120° C. at 2 millimeters pressure and having a viscosity above 45 seconds Saybolt at 100° F.

5. An insecticidal composition comprising 2.4-dinitro-6-methyl phenol dissolved in an alpha-diphenyl-ethane fraction boiling above 120° C. at 2 millimeters pressure and having a viscosity above 45 seconds Saybolt at 100° F.

GEORGE E. LYNN.
FRED W. FLETCHER.